(12) United States Patent
Ahire et al.

(10) Patent No.: US 12,430,889 B2
(45) Date of Patent: Sep. 30, 2025

(54) DISTINGUISHING GESTURE ACTIONS AMONG TRANSPORT OCCUPANTS

(71) Applicant: TOYOTA MOTOR NORTH AMERICA, INC., Plano, TX (US)

(72) Inventors: Sachin J. Ahire, Frisco, TX (US); Manoj Kalamkar, McKinney, TX (US); Christopher J. Risberg, Flower Mound, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 713 days.

(21) Appl. No.: 16/794,218

(22) Filed: Feb. 18, 2020

(65) Prior Publication Data

US 2021/0256316 A1    Aug. 19, 2021

(51) Int. Cl.
| | |
|---|---|
| *G06V 10/764* | (2022.01) |
| *B60W 50/10* | (2012.01) |
| *G06F 18/21* | (2023.01) |
| *G06V 20/59* | (2022.01) |
| *G06V 40/20* | (2022.01) |
| *H04L 9/06* | (2006.01) |

(52) U.S. Cl.
CPC ........ *G06V 10/765* (2022.01); *G06F 18/2163* (2023.01); *G06V 20/59* (2022.01); *G06V 40/20* (2022.01); *B60W 50/10* (2013.01); *H04L 9/0637* (2013.01)

(58) Field of Classification Search
CPC ............. G06K 9/6261; G06K 9/00335; G06K 9/00832; B60W 50/10; H04L 9/0637
USPC .......................................................... 382/104
See application file for complete search history.

(56) References Cited

U.S. PATENT DOCUMENTS

| | | |
|---|---|---|
| 6,926,374 B2 | 8/2005 | Dudeck et al. |
| 7,110,570 B1 | 9/2006 | Berenz et al. |
| 7,130,448 B2 | 10/2006 | Nagaoka et al. |
| 7,202,776 B2 | 4/2007 | Breed |
| 7,301,464 B2 | 11/2007 | Coulter |
| 7,380,948 B2 | 6/2008 | Schofield et al. |
| 7,671,764 B2 | 3/2010 | Uyeki et al. |
| 7,720,580 B2 | 5/2010 | Higgins-Luthman |
| 7,843,313 B2 | 11/2010 | Bazakos et al. |
| 7,899,616 B2 | 3/2011 | Breed |
| 7,925,423 B2 | 4/2011 | Howarter et al. |
| 7,961,094 B2 | 6/2011 | Breed |
| 8,027,029 B2 | 9/2011 | Lu et al. |
| 8,284,041 B2 | 10/2012 | Cuddihy et al. |
| 8,396,252 B2 | 3/2013 | Dokor |
| 8,723,687 B2 | 5/2014 | Thomas |
| 8,725,311 B1 | 5/2014 | Breed |
| 8,744,645 B1 | 6/2014 | Vaghefinazari et al. |

(Continued)

FOREIGN PATENT DOCUMENTS

| | | |
|---|---|---|
| CN | 101414407 A | 4/2009 |
| CN | 101281685 B | 8/2010 |

(Continued)

*Primary Examiner* — Wednel Cadeau

(57) ABSTRACT

An example operation includes one or more of detecting a gesture in a transport performed by a transport occupant, determining an occupant status associated with the transport occupant, determining whether the occupant status permits the gesture to be performed, and performing an action associated with the gesture, when the occupant status permits the gesture to be performed.

20 Claims, 19 Drawing Sheets

(56) References Cited

U.S. PATENT DOCUMENTS

| | | |
|---|---|---|
| 8,761,998 B2 | 6/2014 | Chen et al. |
| 8,849,494 B1 | 9/2014 | Herbach et al. |
| 8,855,900 B2 | 10/2014 | Lection et al. |
| 8,942,881 B2 | 1/2015 | Hobbs et al. |
| 9,152,853 B2 | 10/2015 | Dokor |
| 9,182,233 B2 | 11/2015 | Weng et al. |
| 9,244,527 B2 | 1/2016 | Lathrop et al. |
| 9,332,261 B2 | 5/2016 | Yousefi et al. |
| 9,342,797 B2 | 5/2016 | Dokor et al. |
| 9,493,130 B2 | 11/2016 | Penilla et al. |
| 9,507,346 B1 | 11/2016 | Levinson et al. |
| 9,545,930 B2 | 1/2017 | Ricci et al. |
| 9,551,590 B2 | 1/2017 | Yan et al. |
| 9,711,050 B2 | 7/2017 | Ansari |
| 9,714,037 B2 | 7/2017 | Deruyck et al. |
| 9,734,710 B2 | 8/2017 | Kang |
| 9,761,136 B2 | 9/2017 | Tonguz et al. |
| 9,771,070 B2 | 9/2017 | Zagorski et al. |
| 9,910,441 B2 | 3/2018 | Levinson et al. |
| 9,946,262 B2 | 4/2018 | Ansari |
| 9,949,107 B2 | 4/2018 | Gehrling et al. |
| 9,952,680 B2 | 4/2018 | Ricci |
| 9,964,414 B2 | 5/2018 | Slavin et al. |
| 9,965,169 B2 | 5/2018 | Graumann |
| 9,994,229 B2 | 6/2018 | Ricci |
| 10,120,385 B2 | 11/2018 | Connor |
| 10,198,619 B1 | 2/2019 | Zhu et al. |
| 10,308,258 B2 | 6/2019 | Fung et al. |
| 10,372,129 B1 | 8/2019 | Urmson et al. |
| 10,387,725 B2 | 8/2019 | Zink et al. |
| 10,409,282 B2 | 9/2019 | Tagnemma et al. |
| 10,572,717 B1 | 2/2020 | Zhu et al. |
| 10,620,232 B2 | 4/2020 | Tu et al. |
| 10,683,014 B2 | 6/2020 | Akaba et al. |
| 10,699,326 B2 | 6/2020 | Ricci |
| 10,768,620 B1 | 9/2020 | Tran |
| 10,850,693 B1 | 12/2020 | Pertsel et al. |
| 10,948,907 B2 | 3/2021 | Miller et al. |
| 11,067,986 B2 | 7/2021 | Umetani et al. |
| 11,068,069 B2 | 7/2021 | Page et al. |
| 11,345,368 B2 | 5/2022 | Tian et al. |
| 11,347,225 B2 | 5/2022 | Tatourian |
| 11,873,000 B2 | 1/2024 | Ahire et al. |
| 2006/0155427 A1 | 7/2006 | Yang |
| 2007/0195997 A1 | 8/2007 | Paul et al. |
| 2010/0235034 A1 | 9/2010 | Higgins |
| 2013/0155237 A1 | 6/2013 | Paek et al. |
| 2013/0162449 A1 | 6/2013 | Ginsberg |
| 2013/0204457 A1 | 8/2013 | King et al. |
| 2013/0261871 A1 | 10/2013 | Hobbs et al. |
| 2014/0223384 A1 | 8/2014 | Graumann |
| 2014/0309806 A1* | 10/2014 | Ricci ............ G06F 21/31 701/1 |
| 2014/0309871 A1 | 10/2014 | Ricci |
| 2015/0131857 A1 | 5/2015 | Han et al. |
| 2015/0375756 A1 | 12/2015 | Do et al. |
| 2016/0103499 A1 | 4/2016 | Yamamoto et al. |
| 2016/0176372 A1 | 6/2016 | Kim |
| 2016/0281620 A1 | 9/2016 | Nakade et al. |
| 2016/0357187 A1 | 12/2016 | Ansari |
| 2016/0357262 A1 | 12/2016 | Ansari |
| 2016/0362117 A1 | 12/2016 | Kaufmann et al. |
| 2017/0006151 A1 | 1/2017 | Doorandish |
| 2017/0010679 A1 | 1/2017 | Hillis et al. |
| 2017/0017392 A1 | 1/2017 | Castaneda et al. |
| 2017/0068438 A1 | 3/2017 | Ricci |
| 2017/0120930 A1* | 5/2017 | Ling ............ G06T 7/20 |
| 2017/0123428 A1 | 5/2017 | Levinson et al. |
| 2017/0161575 A1 | 6/2017 | Banno et al. |
| 2017/0269695 A1 | 9/2017 | Tokish et al. |
| 2017/0282717 A1 | 10/2017 | Jang et al. |
| 2017/0315824 A1 | 11/2017 | Ochiai et al. |
| 2018/0061237 A1 | 3/2018 | Erickson et al. |
| 2018/0155967 A1 | 6/2018 | Peng et al. |
| 2018/0210463 A1 | 7/2018 | Switkes et al. |
| 2018/0210464 A1 | 7/2018 | Switkes et al. |
| 2018/0275652 A1 | 9/2018 | Kuwahara et al. |
| 2018/0288586 A1 | 10/2018 | Tran et al. |
| 2018/0342036 A1 | 11/2018 | Zachary |
| 2019/0004614 A1 | 1/2019 | Mori et al. |
| 2019/0025815 A1 | 1/2019 | Saadoun et al. |
| 2019/0052747 A1* | 2/2019 | Breaux ............ H04M 1/72454 |
| 2019/0065873 A1 | 2/2019 | Wang et al. |
| 2019/0070963 A1 | 3/2019 | Jang et al. |
| 2019/0217868 A1 | 7/2019 | Kim et al. |
| 2019/0302895 A1 | 10/2019 | Jiang et al. |
| 2019/0372986 A1 | 12/2019 | Singh |
| 2020/0208460 A1 | 7/2020 | Ma et al. |
| 2020/0334477 A1 | 10/2020 | Aoi et al. |
| 2020/0339133 A1 | 10/2020 | Olsson et al. |
| 2020/0349937 A1 | 11/2020 | Li |
| 2021/0118060 A1 | 4/2021 | Floyd et al. |
| 2021/0182019 A1 | 6/2021 | Li |
| 2021/0197856 A1 | 7/2021 | Hoshina et al. |
| 2021/0248359 A1 | 8/2021 | Du et al. |
| 2021/0253120 A1 | 8/2021 | Ahire et al. |
| 2021/0253135 A1 | 8/2021 | Ahire et al. |
| 2021/0256316 A1 | 8/2021 | Ahire et al. |
| 2021/0293567 A1 | 9/2021 | Bill et al. |
| 2021/0300423 A1 | 9/2021 | Ahire et al. |
| 2021/0311554 A1 | 10/2021 | McFarland, Jr. |
| 2022/0031197 A1 | 2/2022 | McFarland, Jr. |
| 2022/0126864 A1 | 4/2022 | Moustafa et al. |
| 2022/0135050 A1 | 5/2022 | Egashira et al. |
| 2022/0331028 A1 | 10/2022 | Sternitzke et al. |
| 2023/0053103 A1 | 2/2023 | Roberts et al. |
| 2023/0194663 A1 | 6/2023 | Zhang |

FOREIGN PATENT DOCUMENTS

| | | |
|---|---|---|
| CN | 101475002 B | 2/2014 |
| CN | 102866803 B | 2/2016 |
| CN | 105313835 A | 2/2016 |
| CN | 106406514 A | 2/2017 |
| CN | 104271420 B | 6/2017 |
| CN | 103998316 B | 7/2017 |
| CN | 104620257 B | 12/2017 |
| CN | 107851395 A | 3/2018 |
| CN | 108248406 A | 7/2018 |
| CN | 109895788 A | 6/2019 |
| CN | 110045825 A | 7/2019 |
| CN | 113696904 A | 11/2021 |
| CN | 115352450 A | 11/2022 |
| DE | 60106296 | 11/2004 |
| DE | 102010013232 | 6/2016 |
| DE | 102016219795 A1 | 4/2018 |
| DE | 102017216000 A1 | 3/2019 |
| EP | 1542194 A1 | 6/2005 |
| EP | 1271179 B1 | 10/2006 |
| EP | 2216225 A1 | 8/2010 |
| EP | 2228779 A2 | 9/2010 |
| EP | 2673156 A1 | 12/2013 |
| ES | 2391556 | 11/2012 |
| FR | 3095063 A1 | 10/2020 |
| JP | 4028135 B2 | 12/2007 |
| JP | 5016022 B2 | 9/2012 |
| JP | 2013544696 A | 12/2013 |
| JP | 2015125778 A | 7/2015 |
| JP | 6051162 B2 | 12/2016 |
| JP | 6126199 B2 | 5/2017 |
| JP | 6218200 B2 | 10/2017 |
| KR | 101210875 B1 | 12/2012 |
| KR | 20150073857 A | 7/2015 |
| KR | 101542502 B1 | 8/2015 |
| KR | 101614677 B1 | 4/2016 |
| KR | 20180009795 A | 1/2018 |
| WO | 2012002645 A2 | 1/2012 |

\* cited by examiner

DISTINGUISHING GESTURE ACTIONS AMONG TRANSPORT OCCUPANTS

TECHNICAL FIELD

This application generally relates to detecting gestures, and more particularly, to distinguishing gesture actions among transport occupants.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer.

Inside and around vehicles or transports, persons may be attempting to control operations associated with the transport via more advanced control functions, such as voice, gesture, etc. The vehicle control system should be able to identify when a person is conducting a command gesture and when the person or persons are not attempting to control the vehicle. Safety and reliability are required for optimal vehicle operation.

SUMMARY

One example embodiment provides a method that includes one or more of detecting a movement in a transport, determining whether the movement comprises a gesture definition, when the movement comprises a gesture definition, identifying a gesture associated with the gesture definition, and performing an action, via the transport, corresponding to the identified gesture.

Another example embodiment includes a system including a computing device configured to perform one or more of detect a movement in a transport, determine whether the movement comprises a gesture definition, when the movement includes a gesture definition, identify a gesture associated with the gesture definition, and perform an action, via the transport, corresponding to the identified gesture.

Another example embodiment includes a non-transitory computer readable storage medium, that when read by a processor, causes the process to perform one or more of detecting a movement in a transport, determining whether the movement comprises a gesture definition, when the movement includes a gesture definition, identifying a gesture associated with the gesture definition, and performing an action, via the transport, corresponding to the identified gesture.

Another example embodiment includes a method that includes one or more of detecting a gesture in a transport, responsive to the gesture being detected, identifying an action to be performed by the transport, identifying currently engaged transport operations; determining whether performing the action will exceed a threshold transport operation level based on the currently engaged transport operations, and determining whether to perform or cancel the action corresponding to the detected gesture based on whether the threshold transport operation level will be exceeded.

Another example embodiment includes a system including a computing device configured to perform one or more of detect a gesture in a transport, responsive to the gesture being detected, identify an action to be performed by the transport, identify currently engaged transport operations, determine whether performing the action will exceed a threshold transport operation level based on the currently engaged transport operations, and determine whether to perform or cancel the action corresponding to the detected gesture based on whether the threshold transport operation level will be exceeded.

Another example embodiment includes a non-transitory computer readable storage medium configured to store instructions that when read by a processor, cause the processor to perform one or more of detecting a gesture in a transport, responsive to the gesture being detected, identifying an action to be performed by the transport, identifying currently engaged transport operations, determining whether performing the action will exceed a threshold transport operation level based on the currently engaged transport operations, and determining whether to perform or cancel the action corresponding to the detected gesture based on whether the threshold transport operation level will be exceeded.

Another example embodiment includes a method including one or more of detecting a gesture in a transport performed by a transport occupant, determining an occupant status associated with the transport occupant, determining whether the occupant status permits the gesture to be performed, and performing an action associated with the gesture, when the occupant status permits the gesture to be performed.

Another example embodiment includes a system including a computing device configured to perform one or more of detect a gesture in a transport performed by a transport occupant, determine an occupant status associated with the transport occupant, determine whether the occupant status permits the gesture to be performed, and perform an action associated with the gesture, when the occupant status permits the gesture to be performed.

Another example embodiment includes a non-transitory computer readable storage medium configured to store instructions that when read by a process, cause the processor to perform one or more of detecting a gesture in a transport performed by a transport occupant, determining an occupant status associated with the transport occupant, determining whether the occupant status permits the gesture to be performed, and performing an action associated with the gesture, when the occupant status permits the gesture to be performed.

DETAILED DESCRIPTION

Figure 1A:
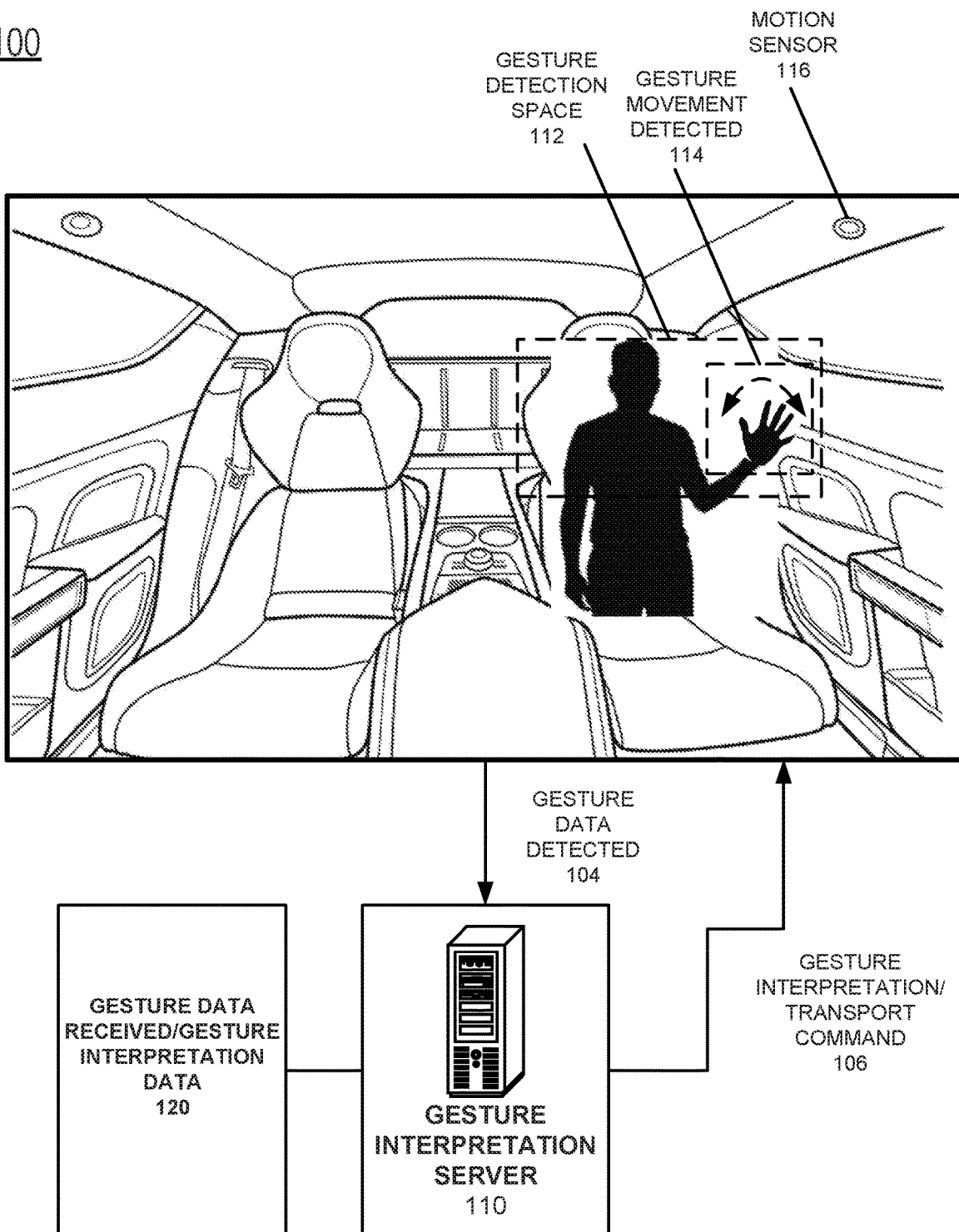
FIG. 1A illustrates an example gesture detection operation being performed inside a transport, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Autonomous driving system utilize software and an array of sensors. Machine learning, sensors including cameras, can be utilized to allow a self-driving car to navigate.

In another embodiment, GPS, maps and other cameras and sensors are used in autonomous vehicles without lidar as lidar is often viewed as being expensive and unnecessary. Researchers have determined that stereo cameras are a low-cost alternative to the more expensive lidar functionality.

The instant application includes, in certain embodiments, authorizing a vehicle for service via an automated and quick authentication scheme. For example, driving up to a charging station or fuel pump may be performed by a vehicle operator and the authorization to receive charge or fuel may be performed without any delays provided the authorization is received by the service station. A vehicle may provide a communication signal that provides an identification of a vehicle that has a currently active profile linked to an account that is authorized to accept a service which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1A illustrates an example gesture detection operation being performed inside a transport, according to example embodiments. Referring to FIG. 1A, the configuration 100 provides an in-transport gesture event. For example, one or more sensors 116 in the transport may identify a movement associated with one or more passengers. In the case of a potential detectable gesture (e.g., hand movement, head/eye/mouth movement, arm movement, finger movement, leg movement), which is performed in a particular gesture detection space, which may be a limited 3-dimensional voluminous area that is continuously monitored by the motion sensor(s) 116 for recognizable gestures. The sensors 116 may detect a movement in the transport. The movement may have a minimum requirement for time, repetition and/or sequences to ensure a valid gesture and to limit a number of false positives detected by the motion sensor and processed by the on-board vehicle computer and/or a remote server 110.

The process may then determine whether the detected movement includes a gesture definition. The gesture definition requirement may include a time constraint (e.g., 3-5 seconds max/min), a distance requirement (e.g., 6 inches-24 inches), a location requirement (e.g., within a 24 inch by 12 inch by 12 inch volume area around the center of the passenger seats-gesture space 112), a location requirement (e.g., front seats, rear seats, one or both, etc.). When the requirements are satisfied, the gesture movement that is detected 114 is processed to determine whether to conduct an action. The gesture data that is detected 104 may be sent to a gesture interpretation server 110 for processing of the captured motion, video and/or other data necessary to determine whether the potential gesture qualifies as a valid gesture and whether action should be taken. The databank of gesture data received and stored may be used to compare the data to known gesture interpretation data 120 to link the gesture data to an actual gesture identified in the databank. Once a gesture is selected that matches the gesture data received and the gesture is certified by the server 110, the gesture interpretation and/or transport command 106 may be performed to modify the transport status. For example, the gesture could be, speed-up, slow-down, turn radio on/off, turn volume up/down, change radio station, call a contact number, text message a contact number, increase/decrease air temperature, order a service, conduct navigation commands, etc. When the movement includes a gesture definition, a gesture associated with the gesture definition is identified by comparing the data received to known gesture data. An action is then performed, via the transport, corresponding to the identified gesture. The gesture definition includes a plurality of gesture requirements such as a range of motion requirement, a detection space requirement, and a repetition requirement.

In one example, the range of motion requirement includes one or more of a distance vector and a direction vector requirement, and the detection space requirement includes a voluminous area where the movement is detected, and the repetition requirement includes a minimum number of repetitive movements. The movement is disqualified as a potential gesture when the movement fails to pass a gesture definition test based on the comparison of data, one or more disqualifying actions are detected, such as the type of request, the transport status, the transport speed, etc., and/or a degree of distraction has exceeded a threshold degree of distraction. In this example, the transport control system (not shown) may be a computer on-board the transport or from a remote source that is used to determine a current vehicle status and how the new action invoked by the gesture would affect the transport status. If the status is moving too quickly, above a threshold speed, and the radio is too loud, above a threshold volume control, then the option to call or message a remote party may be unavailable until the vehicle slows down and/or the radio is turned off.

The disqualifying actions may include one or more of the detected movement being performed outside of a voluminous area where the movement is required to occur, one or more hands are identified as holding a steering wheel, and/or one or more hands are identified as holding a mobile device. The person that is performing the hand movements may be disqualified if they are driving the transport by holding the steering wheel, if they are holding a mobile device, which may suggest a call is being placed or the movement was a false positive. The process may instead provide identifying the gesture definition from a memory and confirming the gesture definition is valid when the gesture was performed correctly and the comparison was validated. As gestures are validated, the process may include creating a blockchain transaction that includes the gesture and the action to be performed once the gesture is recognized. The process may then include storing the blockchain transaction in a distributed ledger.

Figure 1B:
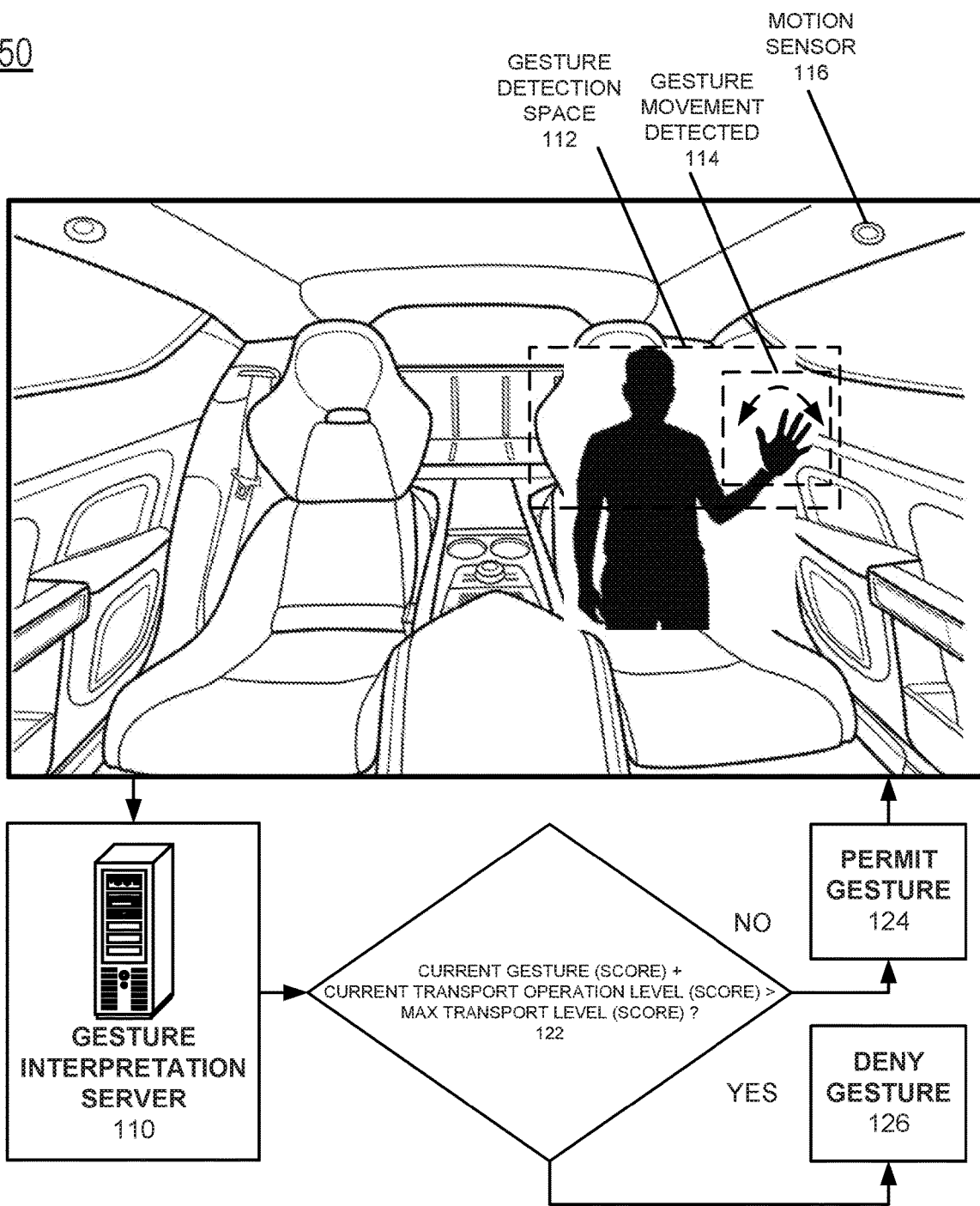
FIG. 1B illustrates an example gesture detection and transport operation analysis procedure, according to example embodiments.

FIG. 1B illustrates an example gesture detection and transport operation analysis procedure, according to example embodiments. Referring to FIG. 1B, the process may include a configuration 150 which includes the same gesture detection arrangement as the example in FIG. 1A, however, the gesture identified and sent for processing may be permitted or denied depending on a maximum transport level (score), such as a numerical score which dictates whether the gesture will modify a current score in a manner that is unacceptable or acceptable to the transport operation. For example, the current gesture score may be based on the type of gesture, if the gesture performs a distracting or increasingly dangerous activity, then the score may be higher, such as turning up the music volume, calling a contact number, speeding up the transport speed, etc. However, some gestures may have neutral '0' scores, such as turning off the radio, slowing down the transport by less than a threshold amount (10 MPH), canceling a navigation control system, etc. Given the current score of the transport's operation, which may be based on radio station selection, volume, transport speed, current mobile device function/calling status, etc., if the current gesture score plus the current transport score together exceed a maximum transport safe operation score, then the determination 122 operation may cause the received gesture to be denied 126 or permitted 124.

Inside the transport, gesturing must be observed by the transport detection system, however, driving safety is a top priority. In-transport activities, such as talking on the phone, listening to the radio, having media playing in the backseat, using automated driving tools, etc. cannot be ignored when the occupants are attempting to perform additional gestures. At some point in-transport activities will exceed a safety measure score/level and gestures may be ignored, haptic feedback may be used, etc., to alert the occupants to modify their behavior prior to soliciting new actions via gesture.

In operation, a process may include, responsive to the gesture being detected, identifying an action to be performed by the transport, identifying currently engaged transport operations, and determining whether performing the action will exceed a threshold transport operation level based on the currently engaged transport operations, and determining whether to perform or cancel the action corresponding to the detected gesture based on whether the threshold transport operation level will be exceeded. The currently engaged transport operations are associated with a current transport operation level, and the current transport operation level may include one or more of a score, a total number of currently engaged transport operations, types of currently engaged transport operations, and a noise level detected in the transport. The score may be out of 10 or 100. The process may also include identifying an action level associated with the action, and adding the action level to a current transport operation level to determine a modified transport operation level and whether it is within an acceptable range score. When the modified transport operation level exceeds the threshold transport operation level, the action may be prevented from occurring.

The process may also include providing a feedback control prompt to a transport occupant, such that the feedback control prompt includes at least one of cancellation of one or more currently engaged transport operations, haptic feedback to at least one of a vehicle seat, a vehicle steering wheel and a vehicle floor, a warning display message on a display disposed inside the transport, and a warning sound via a speaker disposed inside the transport. Examples of potential transport operations may include a transport navigation, a transport radio, a transport media player, a partial autonomous driving operation, a fully autonomous driving operation, a mobile device operation conducted while the transport is moving, an engine operation, a phone call and a data communication service. The actions may include, for example, one or more of moving the transport, signaling to an external object in a roadway, modifying a current transport navigation route, distributing media data, sending or receiving a wireless communication signal.

Figure 1C:
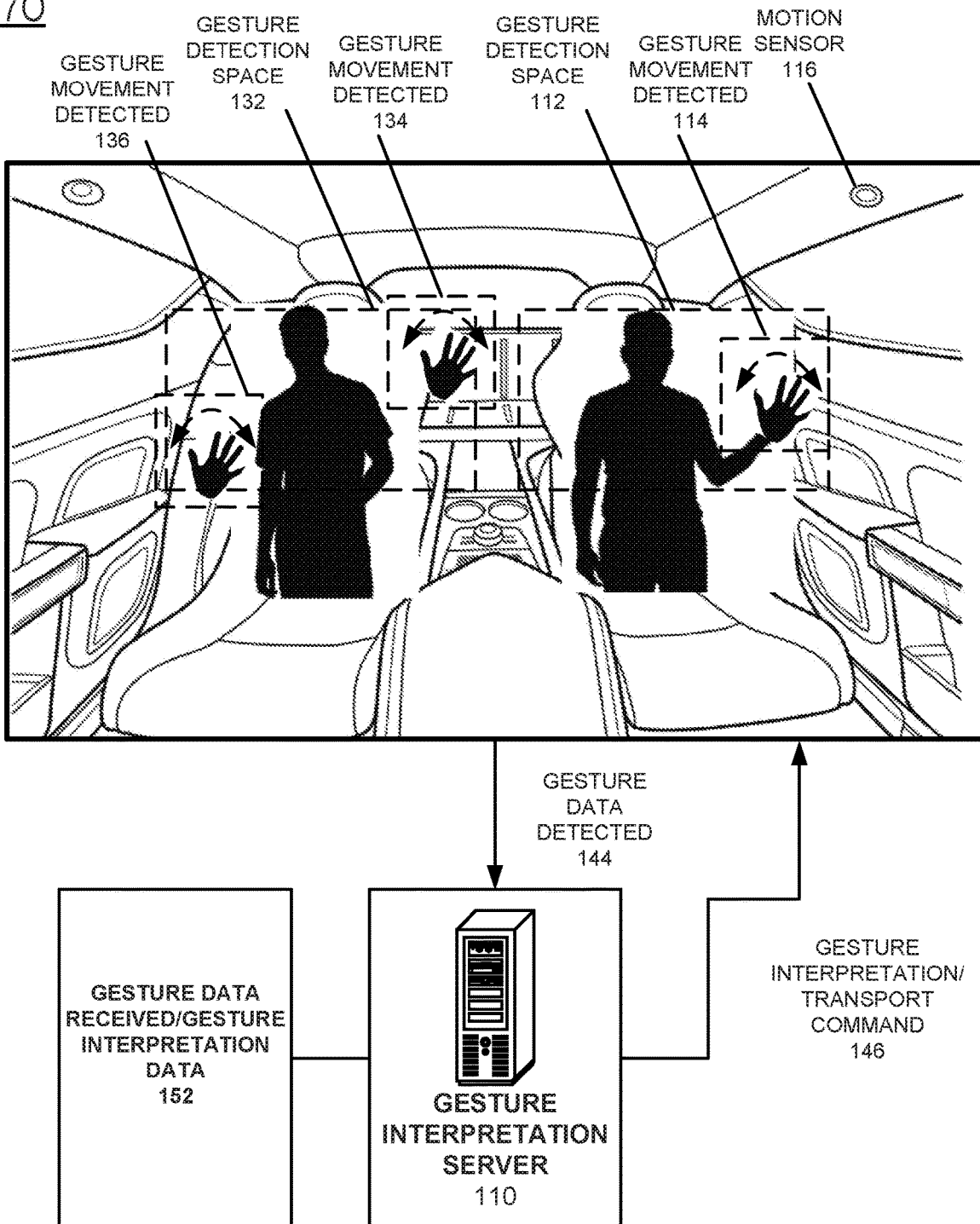
FIG. 1C illustrates an example gesture detection operation where multiple gestures are performed by multiple transport passengers, according to example embodiments.

FIG. 1C illustrates an example gesture detection operation where multiple gestures are performed by multiple transport passengers, according to example embodiments. Inside a transport, gesturing must be identified on a person-by-person basis. For example, in a transport that is offering transportation to multiple occupants, each occupant may have their own access controls and privileges, such as a backseat occupant may control the radio not the transport, and a front seat occupant may control the transport but not necessarily a media screen in the backseat. The transport does not have any way to identify for sure which person is speaking, which user's hand is making which gestures, and, even if the hand could be linked to a body in a particular position and in a particular location, the transport may also be automated and the occupant sitting in the driver's seat may have no role as a driver of the transport. The transport gesture control system (on-board/remote computing system) may detect gestures by various quadrants in the vehicle, profile information and/or other data that dictate which gestures will be recognized and executed by which occupants and which occupant performed which gesture.

One example may provide a configuration 170 where multiple transport occupants are sitting and moving inside a transport. The vehicle sensors 116 may identify hand movements 114, 136 and 134 within various gesture detection spaces 112 and 132 which are continuously monitored via the vehicle sensor configuration. Each gesture may be captured as vector data pertaining to the location and movement identified. The gesture data captured 144 may be processed to identify whether the location of gesture has the assigned privilege to perform the action requested. For example, if a user in the backseat performs a gesture 134 and the gesture is identified as a driving related command, the interpretation server 110 may disregard the gesture since backseat occupants are not permitted to interfere with the operation of the transport. Once the gesture is interpreted and is identified as a qualified gesture, then the gesture may be forwarded 146 to a transport computing device to control the transport. The data that is received and processed 144 may be compared to the known gesture interpretation data 152.

One example process of operation may include detecting a gesture in a transport performed by a transport occupant, this may include multiple gestures by multiple occupants, and determining an occupant status associated with the transport occupant(s). The status may be a role defined by the occupant inside the transport, such as back seat occupant, driver, passenger, etc. The process may include determining whether the occupant status permits the gesture to be performed and performing an action associated with the gesture, when the occupant status permits the gesture to be performed. The process may also include identifying a gesture location of the gesture within the transport, such as in one or more gesture detection spaces, and whether the gesture occurred in the driver's detection space or in another gesture detection location. The process may also include determining whether the gesture location was within one of a plurality of defined voluminous areas inside the transport where gestures are detected, and when the gesture location is within one of the plurality of voluminous areas, identifying the action associated with the gesture. If the gesture is not performed in the defined voluminous area, such as a particular gesture detection space, then the gesture may be disregarded. The process may also include determining whether the gesture location was within one of a plurality of defined voluminous areas inside the transport where gestures are detected, and when the gesture location is not within one of the plurality of voluminous areas, the gesture may be cancelled or disregarded. The process may also include identifying the gesture location by determining whether the gesture is performed in at least one priority location within the transport, such as the driver's seat, the front passenger's seat or in a designated seat, such as a pre-programmed location in the event of a special needs occupant in the back or a service vehicle where the controllers are the ones in the back of the vehicle. When the gesture is performed in the one priority location within the transport, the action may then be performed. The process also includes identifying the gesture location and determining whether the gesture is performed in at least one priority location within the transport, and when the gesture is not performed in the at least one priority location within the transport, determining whether the action is a transport operation action or a non-transport operation action, and when the action is not a transport operation action, then performing the action. For example, changing the radio station, the navigation route, etc., may not be an operation action, whereas slowing the transport is an operation action. The process may also include determining whether the occupant status indicates the occupant is currently operating a mobile device, and when the occupant status indicates the occupant is currently operating a mobile device, cancelling the gesture.

Figure 2A:
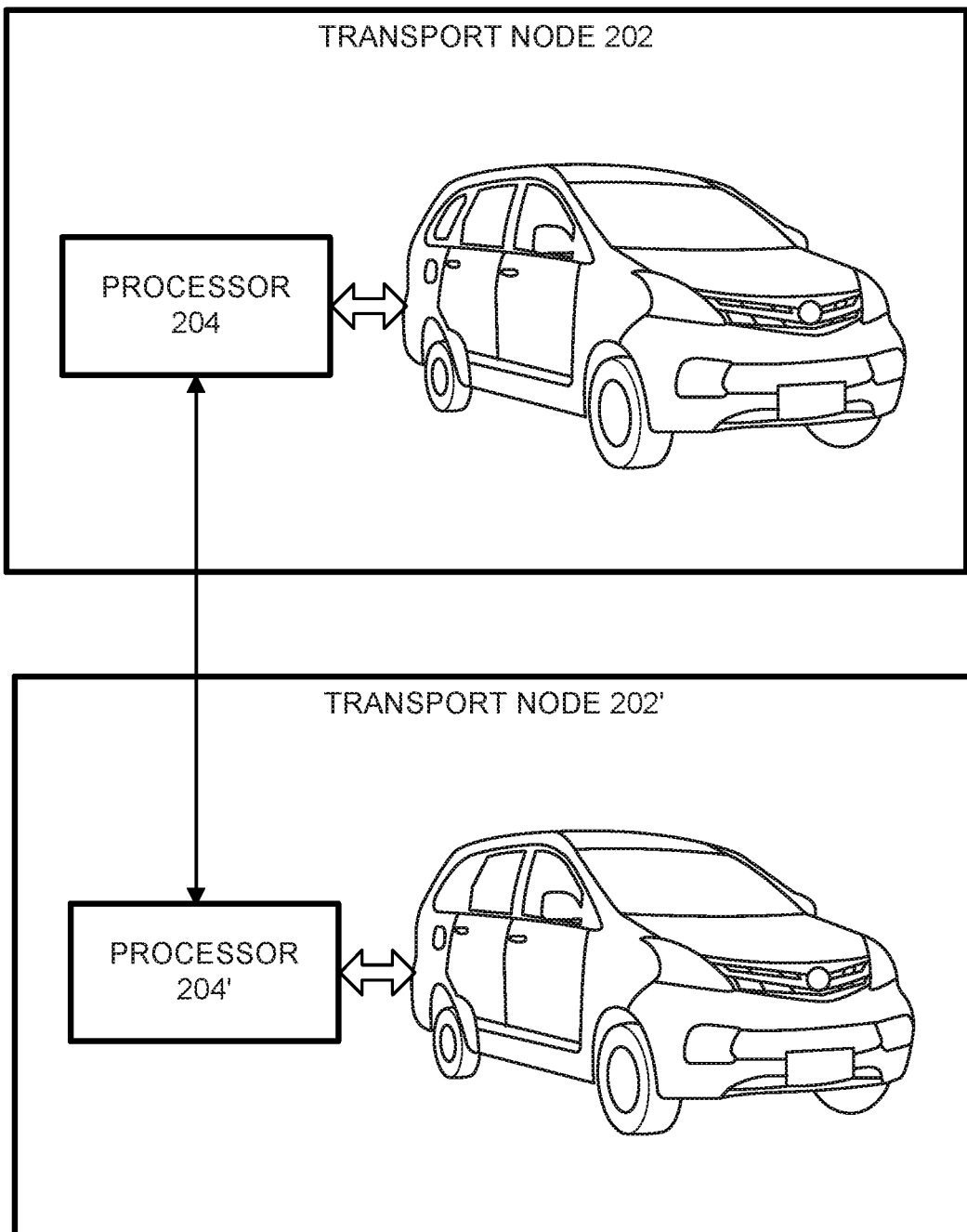
FIG. 2A illustrates a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
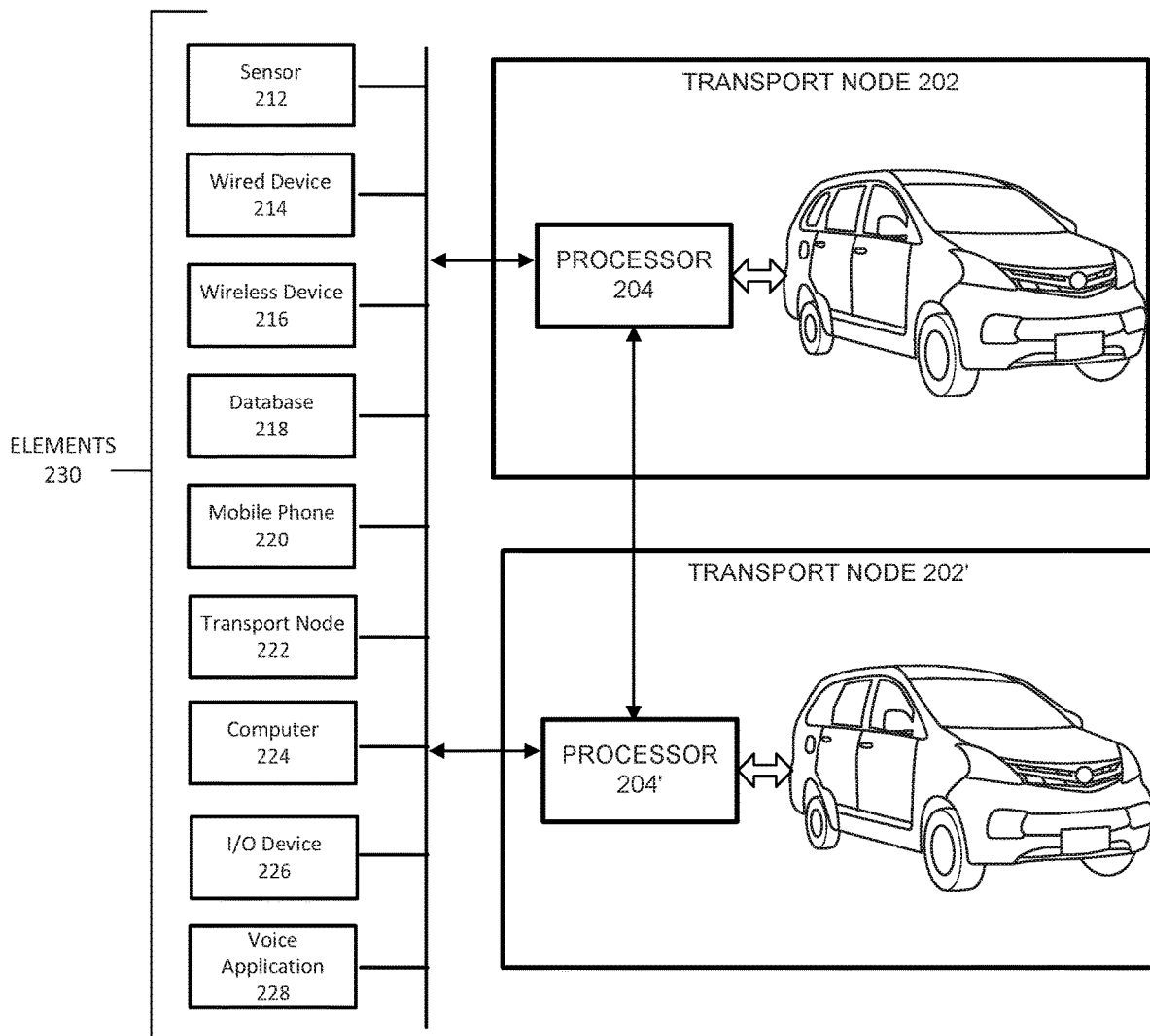
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204 which may initiate the transport node 202 to take an action, may further provide the information or additional information to the processor 204' which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
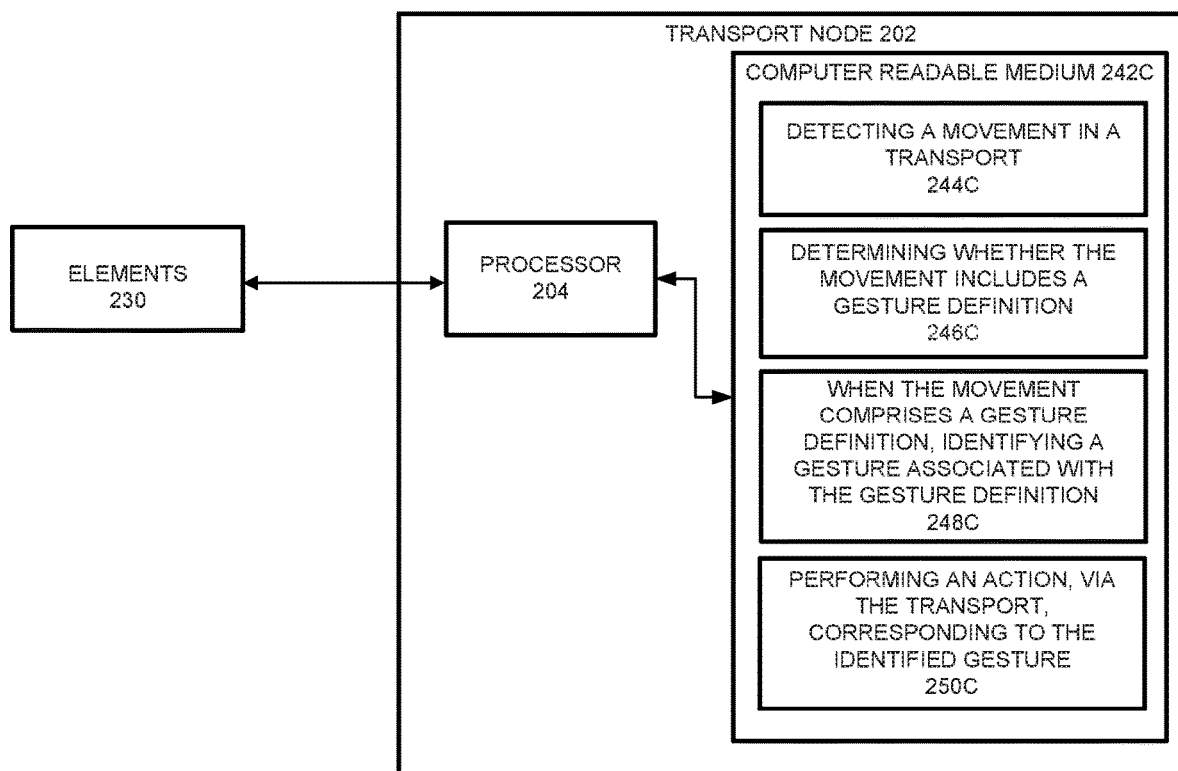
FIG. 2C illustrates yet another transport network diagram, according to example embodiments.

FIG. 2C illustrates yet another transport network diagram 240, according to example embodiments. The network comprises elements including a transport node 202 including a processor 204 and a non-transitory computer readable medium 242C. The processor 204 is communicably coupled to the computer readable medium 242C and elements 230 (which were depicted in FIG. 2B).

The processor 204 performs one or more of detecting a movement in a transport 244C, determining whether the movement includes a gesture definition 246C, when the movement includes a gesture definition, identifying a gesture associated with the gesture definition 248C, and performing an action, via the transport, corresponding to the identified gesture 250C.

Figure 2D:
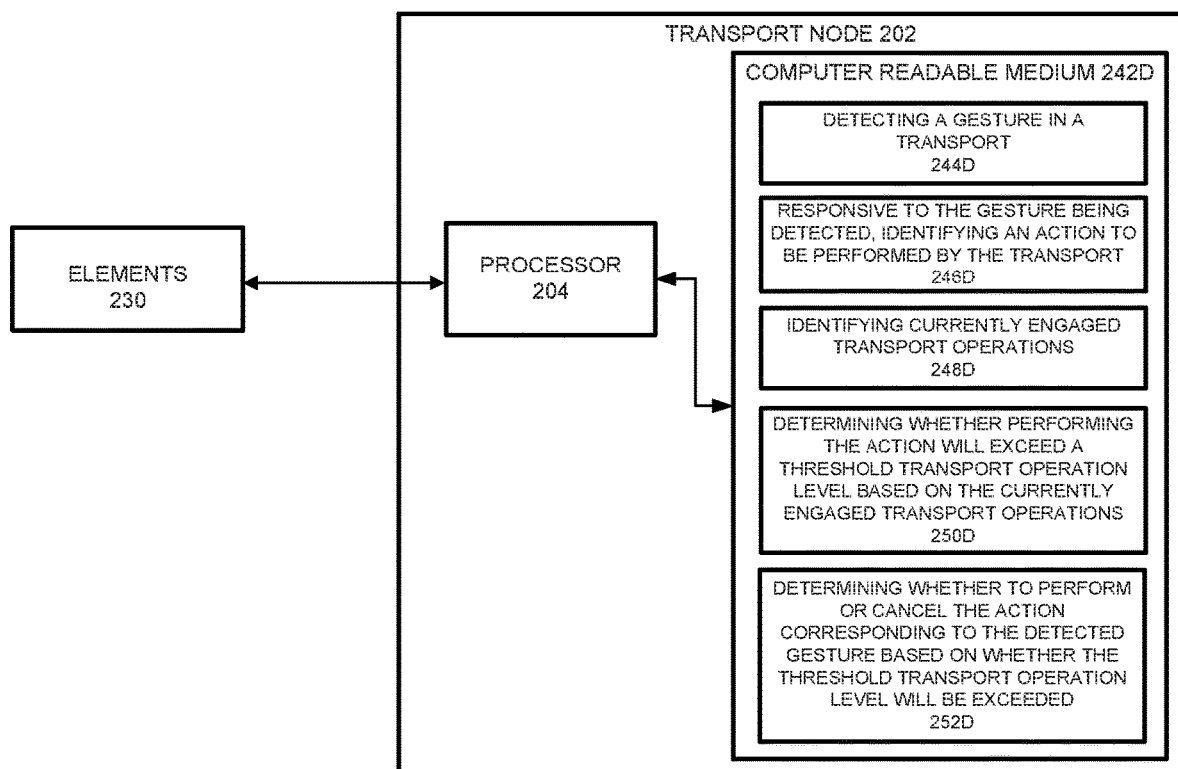
FIG. 2D illustrates a further transport network diagram, according to example embodiments.

FIG. 2D illustrates a further transport network diagram 260, according to example embodiments. The network comprises elements including a transport node 202 including a processor 204 and a non-transitory computer readable medium 242D. The processor 204 is communicably coupled to the computer readable medium 242D and elements 230 (which were depicted in FIG. 2B).

The processor 204 performs one or more of detecting a gesture in a transport 244D, responsive to the gesture being detected, identifying an action to be performed by the transport 246D, identifying currently engaged transport operations 248D, determining whether performing the action will exceed a threshold transport operation level based on the currently engaged transport operations 250D, determining whether to perform or cancel the action corresponding to the detected gesture based on whether the threshold transport operation level will be exceeded 252D.

Figure 2E:
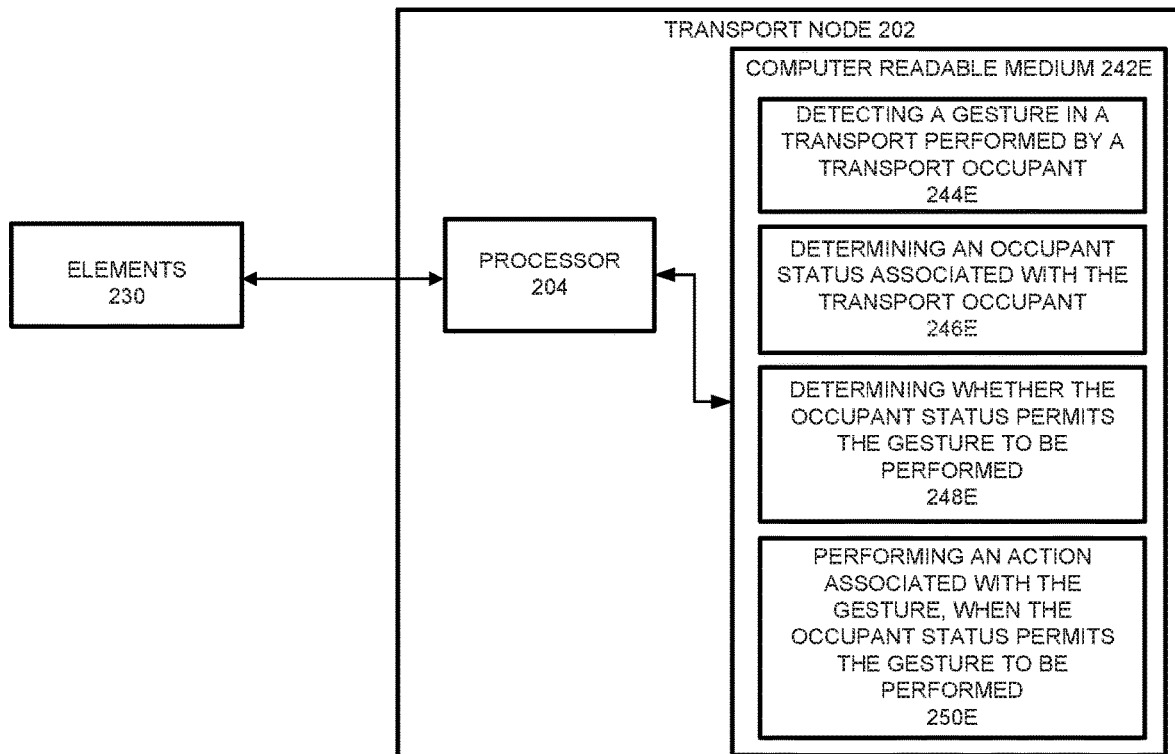
FIG. 2E illustrates a yet further transport network diagram, according to example embodiments.

FIG. 2E illustrates a yet further transport network diagram 270, according to example embodiments. The network comprises elements including a transport node 202 including a processor 204 and a non-transitory computer readable medium 242E. The processor 204 is communicably coupled to the computer readable medium 242E and elements 230 (which were depicted in FIG. 2B).

The processor 204 performs one or more of detecting a gesture in a transport performed by a transport occupant 244E, determining an occupant status associated with the transport occupant 246E, determining whether the occupant status permits the gesture to be performed 248E, performing an action associated with the gesture, when the occupant status permits the gesture to be performed 250E.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 3A:
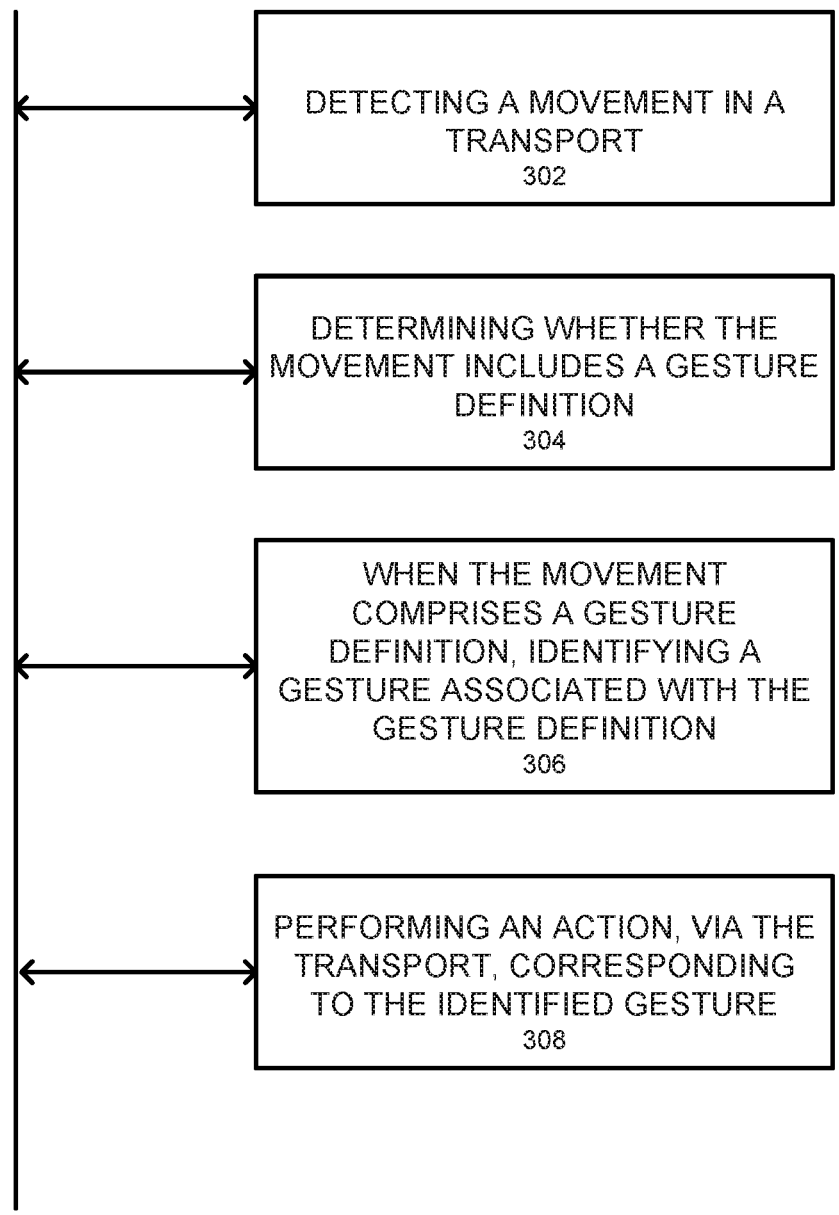
FIG. 3A illustrates a flow diagram, according to example embodiments.

FIG. 3A illustrates a flow diagram 300, according to example embodiments.

Referring to FIG. 3A, the process may include detecting a movement in a transport 302, determining whether the movement includes a gesture definition 304, when the movement includes a gesture definition, identifying a gesture associated with the gesture definition 306, and performing an action, via the transport, corresponding to the identified gesture 308.

Figure 3B:
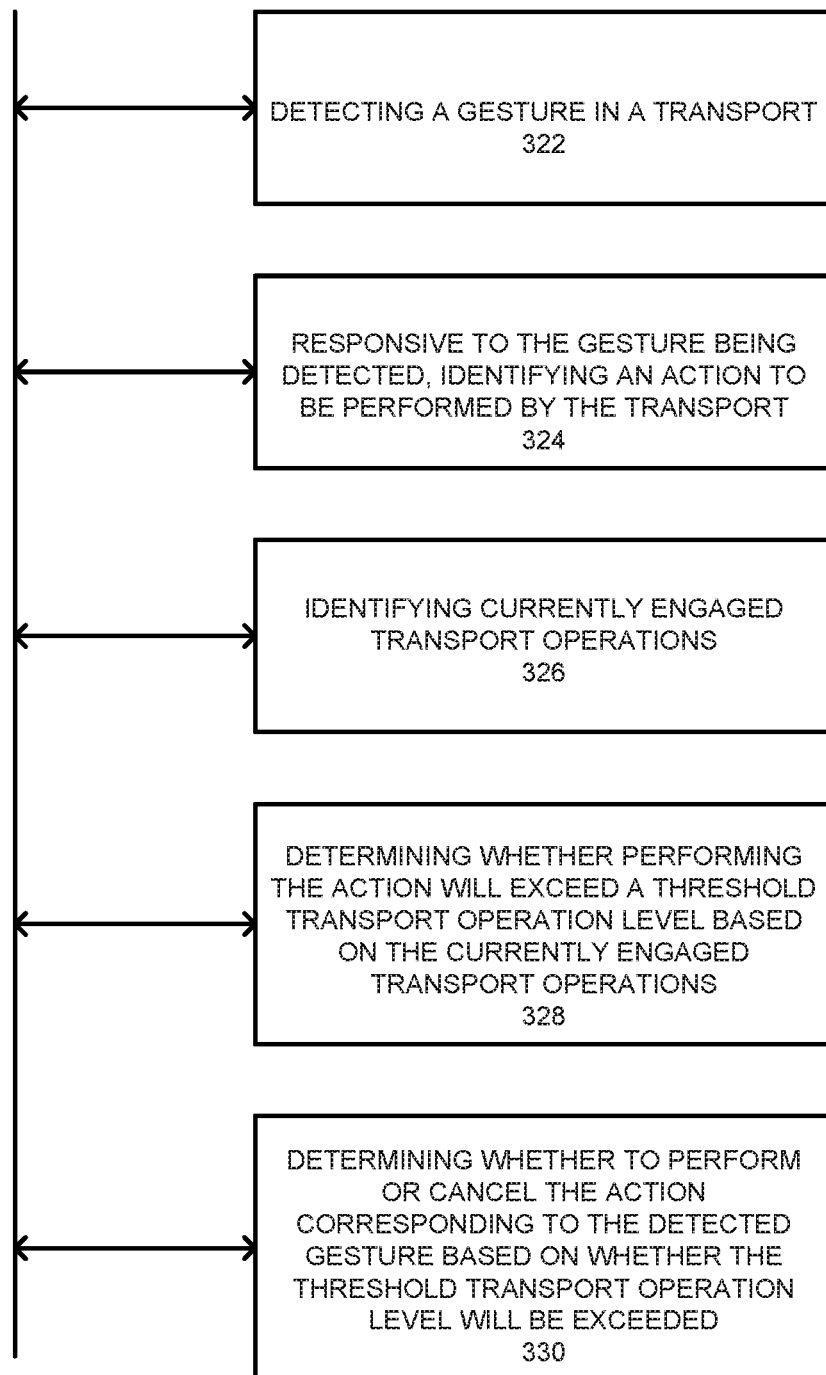
FIG. 3B illustrates another flow diagram, according to example embodiments.

FIG. 3B illustrates another flow diagram 320, according to example embodiments. Referring to FIG. 3B, the process includes detecting a gesture in a transport 322, responsive to the gesture being detected, identifying an action to be performed by the transport 324, identifying currently engaged transport operations 326, determining whether performing the action will exceed a threshold transport operation level based on the currently engaged transport operations; 328, and determining whether to perform or cancel the action corresponding to the detected gesture based on whether the threshold transport operation level will be exceeded 330.

Figure 3C:
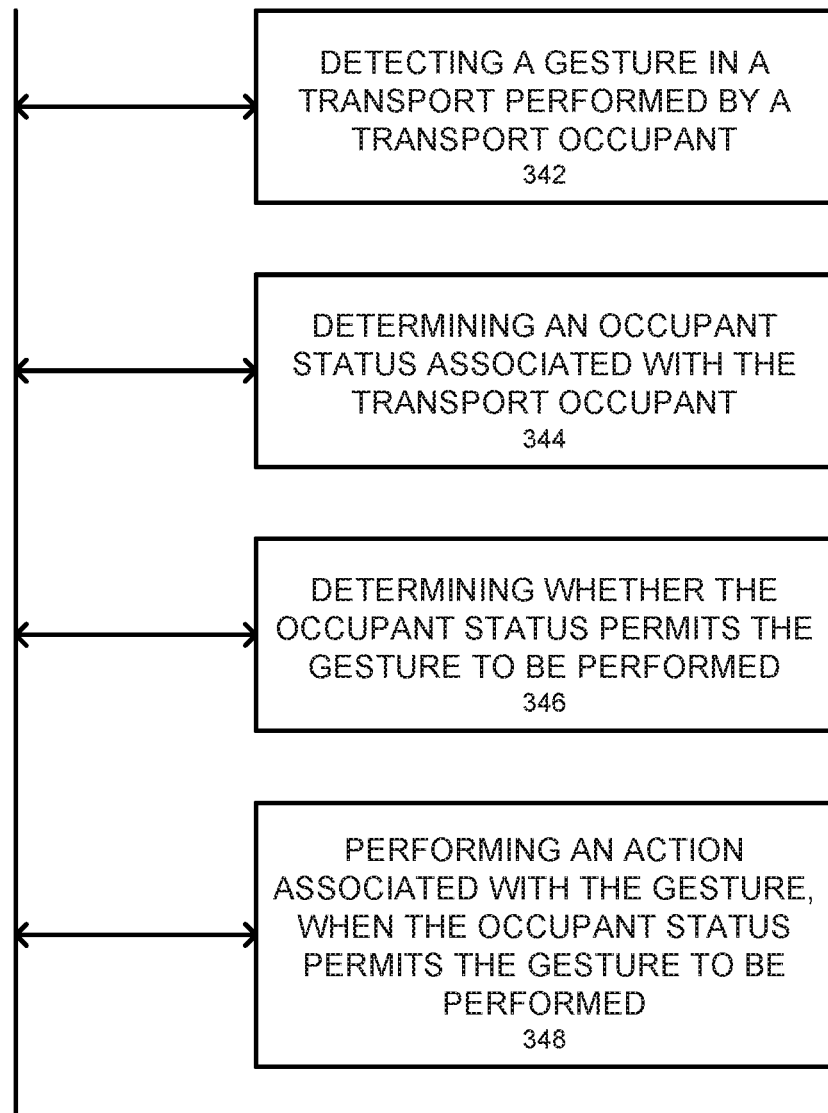
FIG. 3C illustrates yet another flow diagram, according to example embodiments.

FIG. 3C illustrates yet another flow diagram 340, according to example embodiments. Referring to FIG. 3C, the process includes detecting a gesture in a transport performed by a transport occupant 342, determining an occupant status associated with the transport occupant 344, determining whether the occupant status permits the gesture to be performed 346, and performing an action associated with the gesture, when the occupant status permits the gesture to be performed 348.

Figure 4:
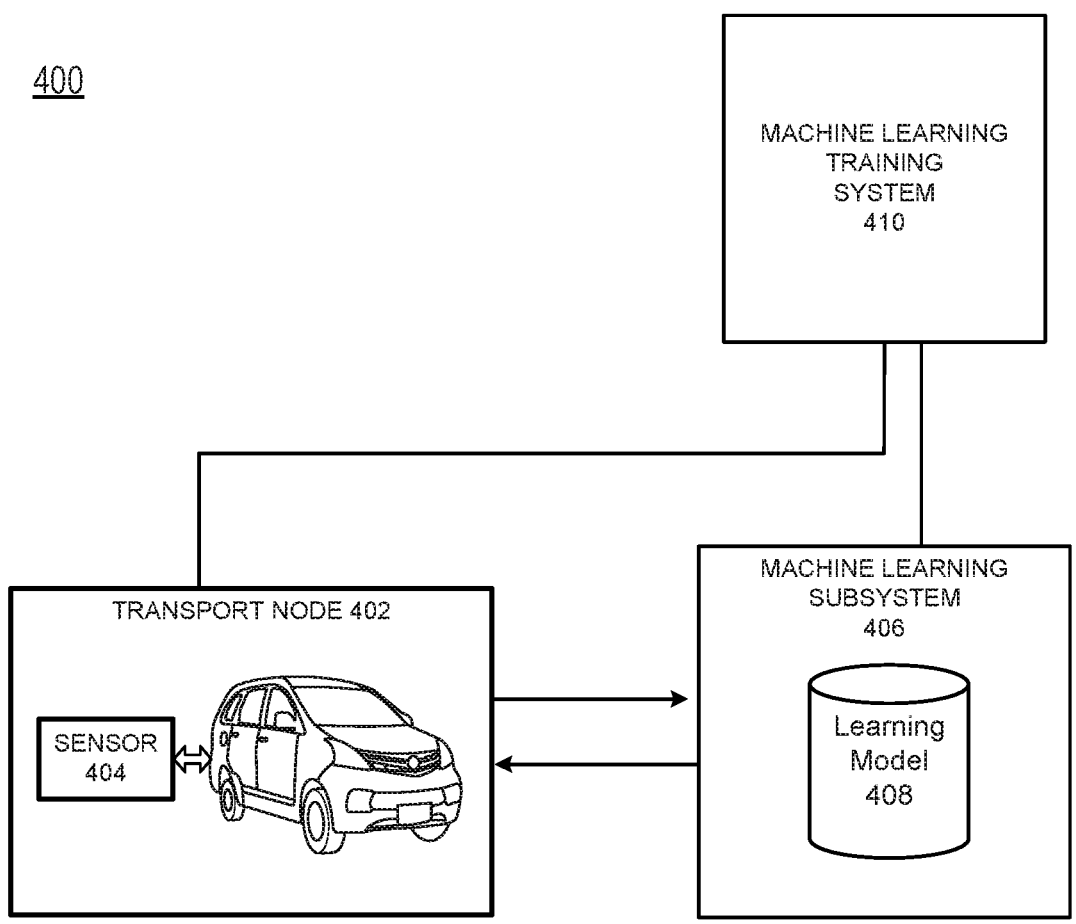
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408 which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408 which returns one or more predictions. The machine learning subsystem 406 sends one or more instructions to the transport node 402 based on the predictions from the learning model 408.

In a further embodiment, the transport node 402 may send the one or more sensor 404 data to the machine learning training system 410. In yet another embodiment, the machine learning subsystem 406 may sent the sensor 404 data to the machine learning subsystem 410. One or more of the applications, features, steps, solutions, etc., described and/or depicted herein may utilize the machine learning network 400 as described herein.

Figure 5A:
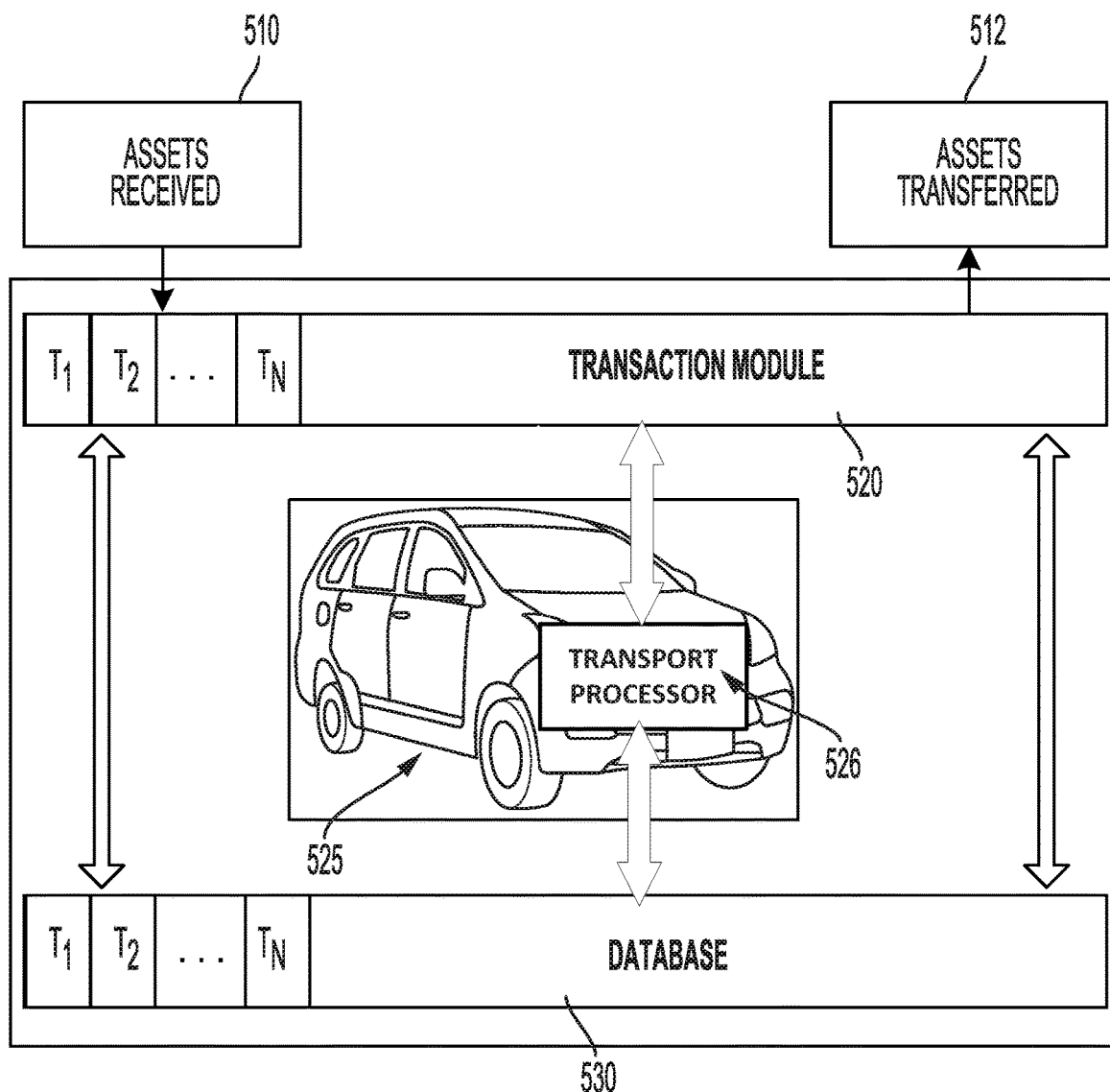
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
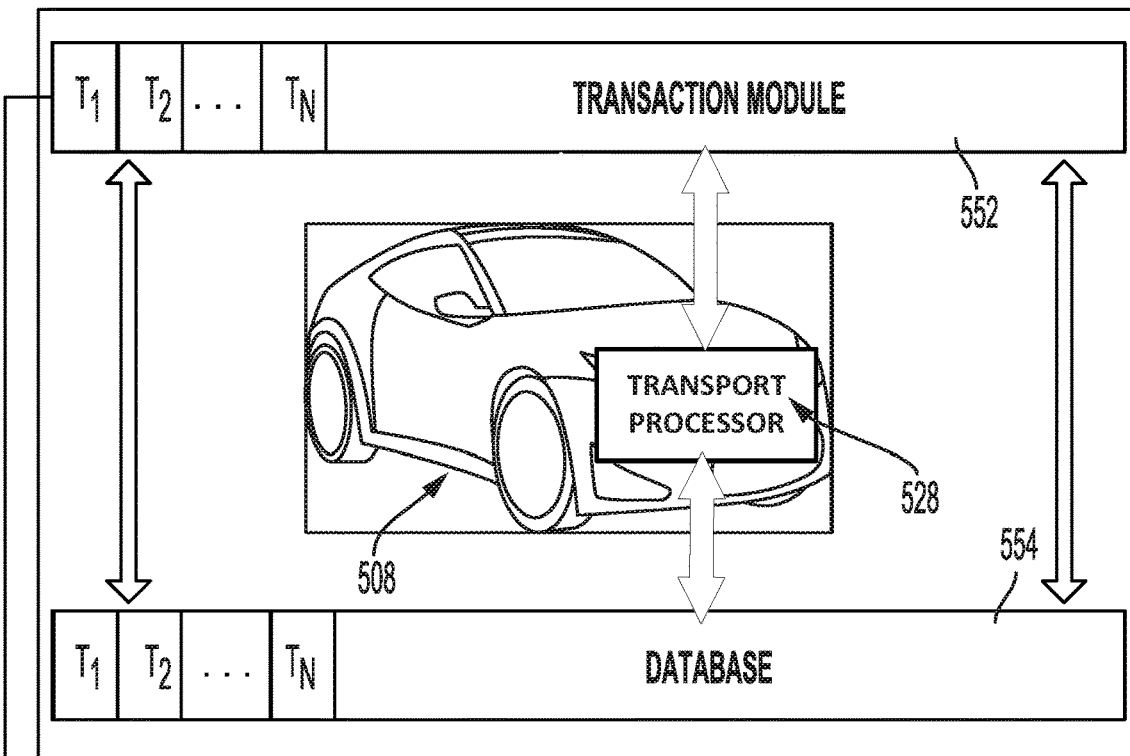
FIG. 5B illustrates another example vehicle configuration for managing database transactions conducted among various vehicles, according to example embodiments
Figure 5B:
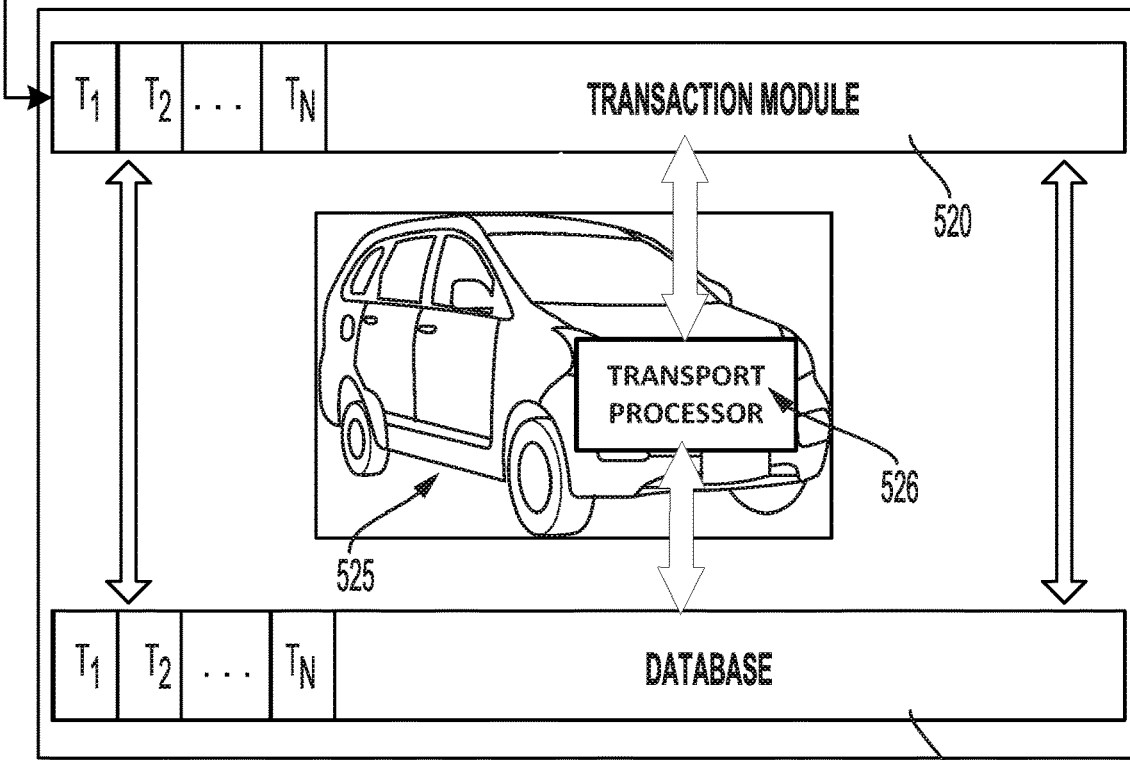

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, a transport processor 528 and the transaction module 552. The vehicle 508 may notify another vehicle 525 which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
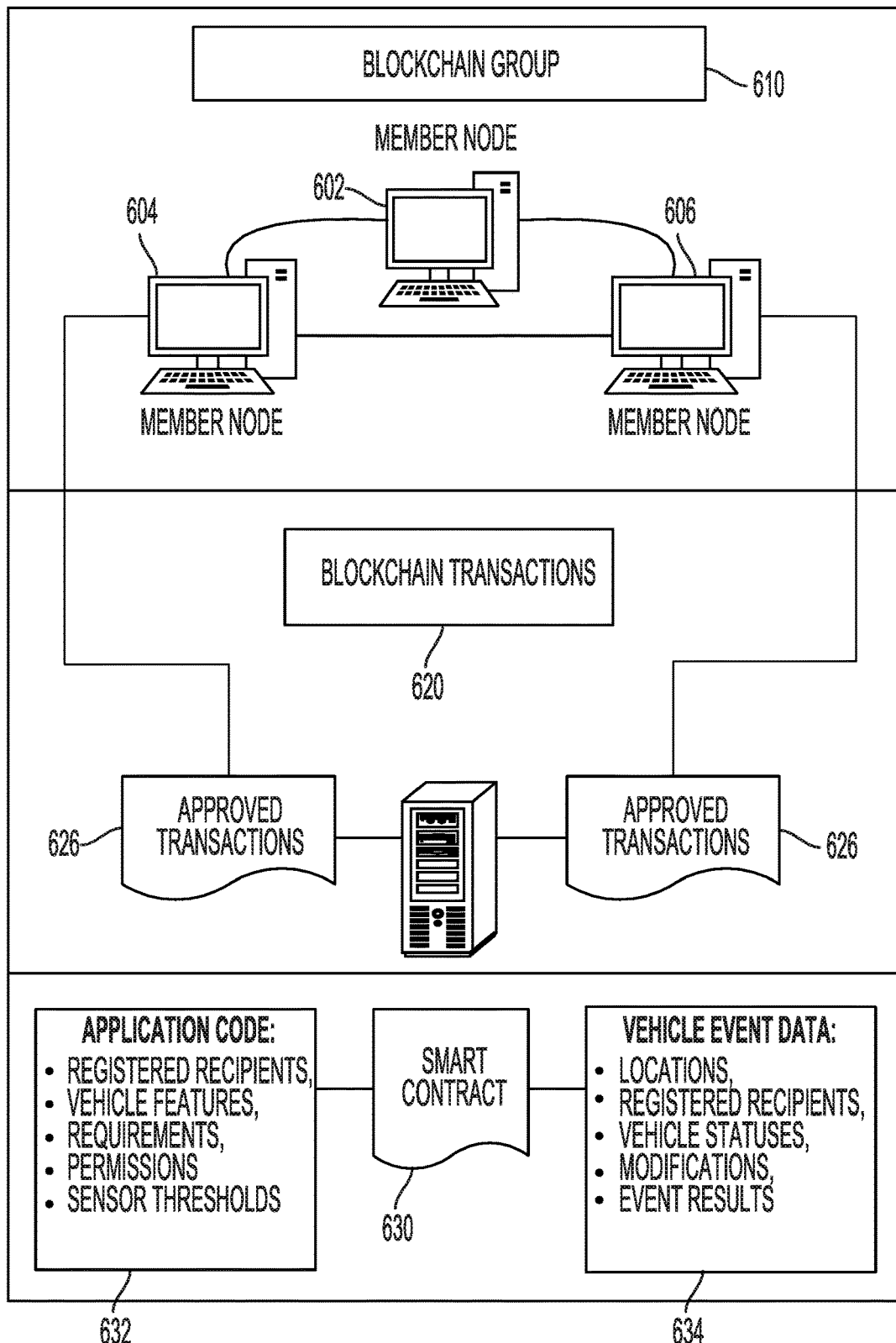
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
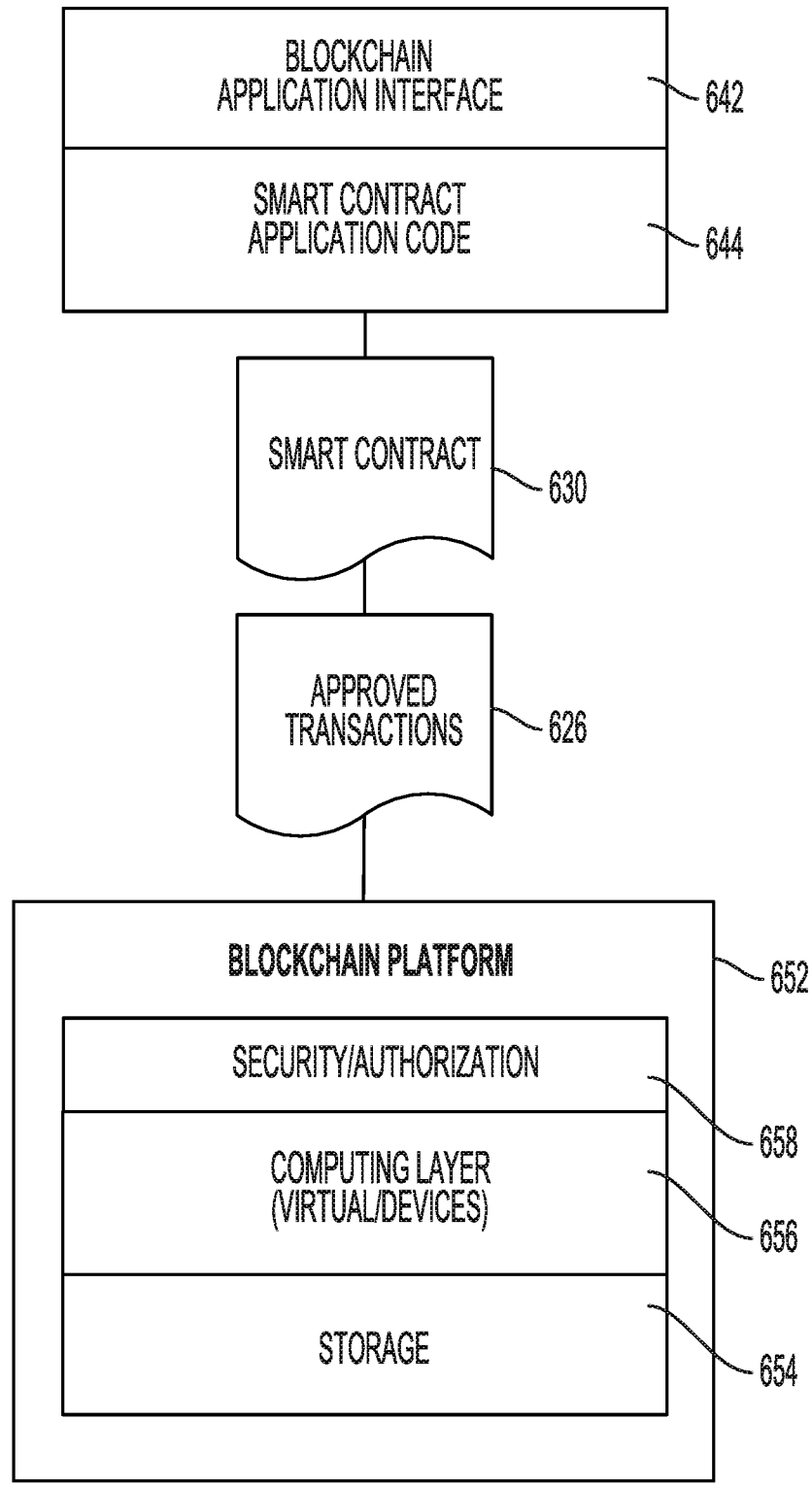
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code which when executed causes the transaction terms and conditions to become active. The smart contract 630, when executed, causes certain approved transactions 626 to be generated, which are then forwarded to the blockchain platform 652. The platform includes a security/authorization 658, computing devices which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
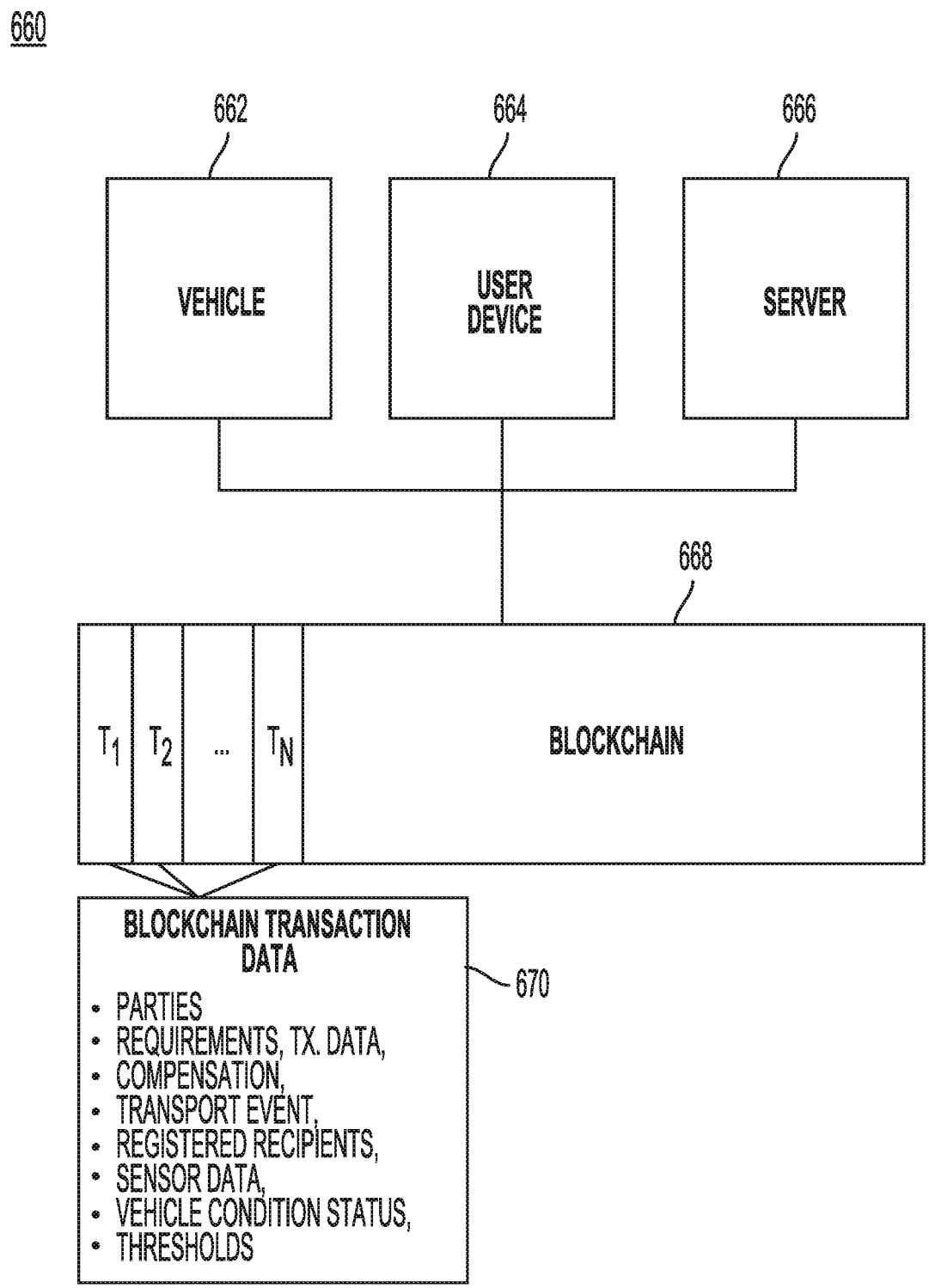
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
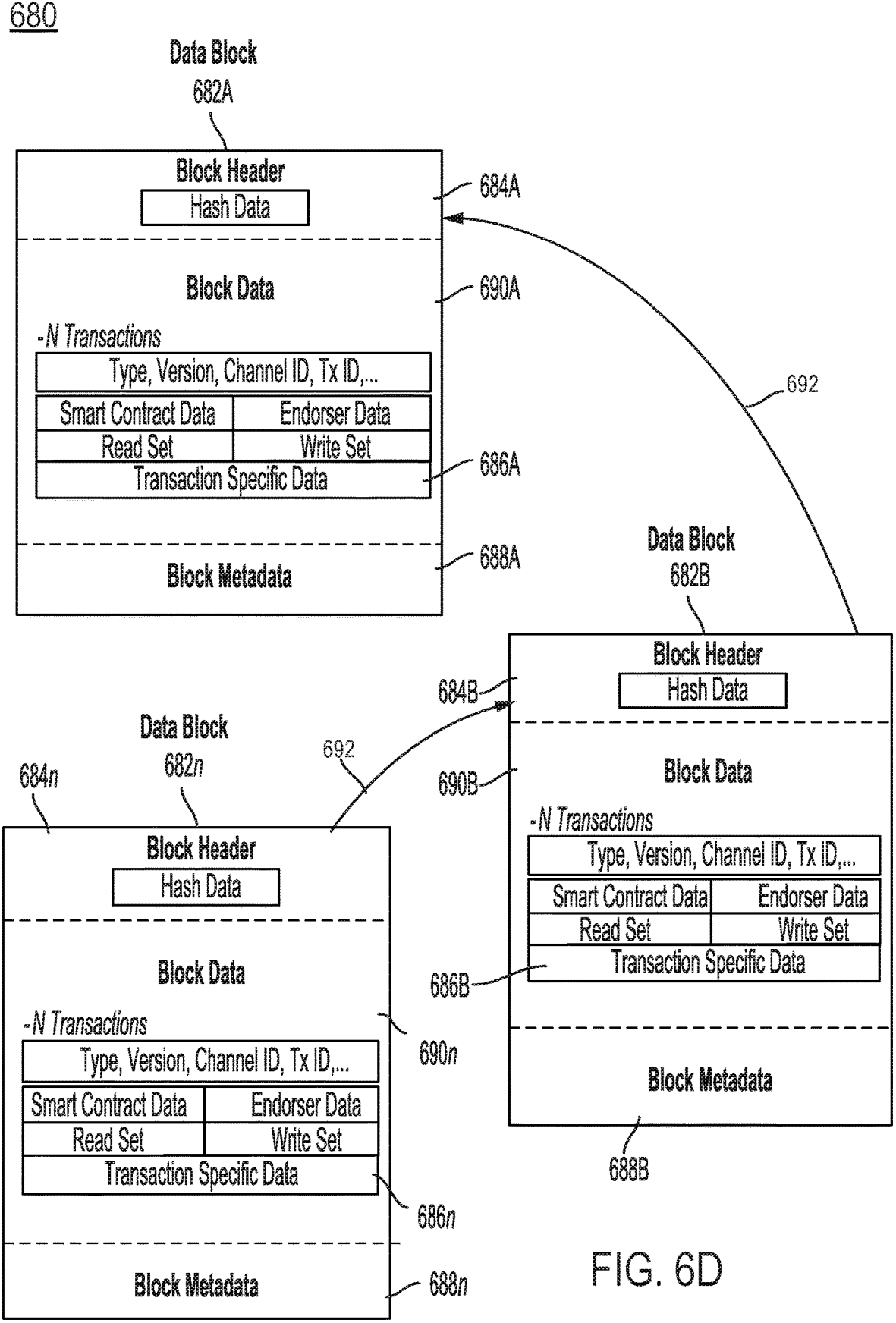
FIG. 6D illustrates example data blocks, according to example embodiments.

FIG. 6D illustrates blockchain blocks 680 that can be added to a distributed ledger, according to example embodiments, and contents of block structures 682A to 682n. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684*n*, transaction specific data 686A to 686*n*, and block metadata 688A to 688*n*. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A which stores entry data; however, this is not a requirement. The block 682A may store transactional information of N entries (e.g., 100, 500, 1000, 2000, 3000, etc.) within the block data 690A to 690*n*. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 682B to 682n in the blockchain also have headers, files, and values. However, unlike the first block 682A, each of the headers 684A to 684n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
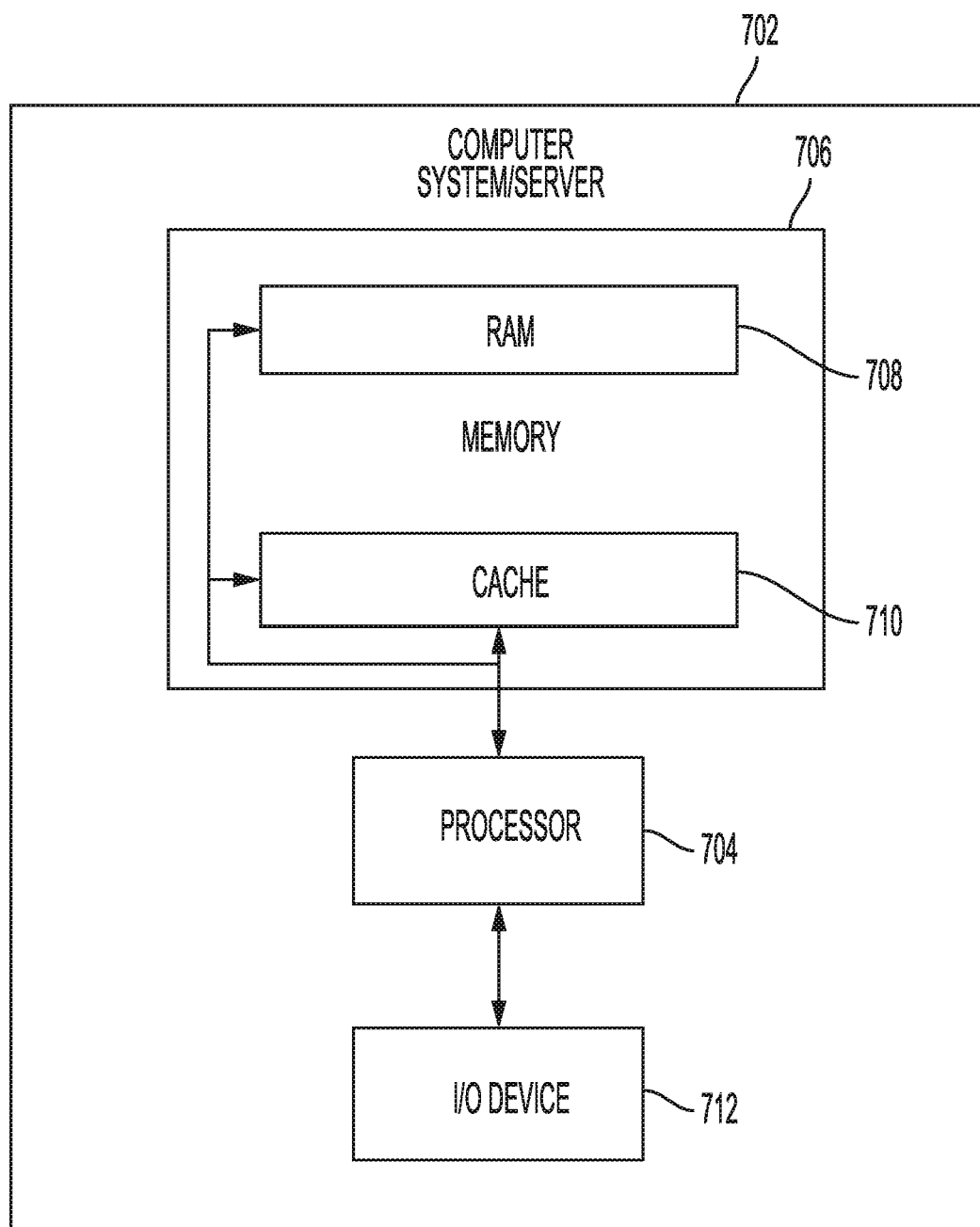
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   detecting a gesture in a transport performed by a transport occupant;
   determining a numerical gesture score associated with the gesture;
   determining an occupant status associated with the transport occupant;
   determining whether the occupant status permits the gesture to be performed;
   determining whether a sum of the numerical gesture score and a numerical current transport operation score exceeds a numerical maximum transport safe operation score threshold, wherein the numerical current transport score is based on one or more components of the transport which are currently being operated and represent one or more numerical scores contributing to the numerical current transport score, and wherein a summed score that exceeds the numerical maximum transport safe operation score threshold is deemed to acceptable to safe transport operation; and performing an action, by the transport, associated with the gesture, when the occupant status permits the gesture to be performed and the sum of the numerical gesture score and the numerical current transport operation score does not cause the transport to exceed the numerical maximum transport safe operation score threshold indicating the transport can be safely operated.

2. The method of claim 1, comprising:
identifying a gesture location of the gesture within the transport.

3. The method of claim 1, comprising:
determining whether the occupant status indicates the occupant is currently operating a mobile device;
when the occupant status indicates the occupant is currently operating a mobile device, cancelling the gesture.

4. The method of claim 2, comprising:
determining whether the gesture location was within one of a plurality of defined voluminous areas inside the transport where gestures are detected; and
when the gesture location is within one of the plurality of voluminous areas, identifying the action associated with the gesture.

5. The method of claim 2, comprising:
determining whether the gesture location was within one of a plurality of defined voluminous areas inside the transport where gestures are detected; and
when the gesture location is not within one of the plurality of voluminous areas, cancelling the gesture.

6. The method of claim 2, wherein identifying the gesture location comprises
determining whether the gesture is performed in at least one priority location within the transport; and
when the gesture is performed in the at least one priority location within the transport, performing the action.

7. The method of claim 2, wherein identifying the gesture location comprises
determining whether the gesture is performed in at least one priority location within the transport; and
when the gesture is not performed in the at least one priority location within the transport, determining whether the action is a transport operation action or a non-transport operation action, and when the action is not a transport operation action, performing the action.

8. A transport, comprising:
a computing device configured to:
detect a gesture in the transport performed by a transport occupant;
determine a numerical gesture score associated with the gesture;
determine an occupant status associated with the transport occupant;
determine whether the occupant status permits the gesture to be performed;
determine whether a sum of the numerical gesture score and a numerical current transport operation score exceeds a numerical maximum transport safe operation score threshold, wherein the numerical current transport score is based on one or more components of the transport which are currently being operated and represent one or more numerical scores contributing to the numerical current transport score, and wherein a summed score that exceeds the numerical maximum transport safe operation score threshold is deemed to unacceptable to safe transport operation; and perform an action associated with the gesture, when the occupant status permits the gesture to be performed and the sum of the numerical gesture score and the numerical current transport operation score does not cause the transport to exceed the numerical maximum transport safe operation score threshold indicating the transport can be safely operated.

9. The transport of claim 8, wherein the computing device is further configured to
identify a gesture location of the gesture within the transport.

10. The transport of claim 8, wherein the computing device is further configured to
determine whether the occupant status indicates the occupant is currently operating a mobile device; and
when the occupant status indicates the occupant is currently operating a mobile device, the computing device cancels the gesture.

11. The transport of claim 9, wherein the computing device is further configured to
determine whether the gesture location was within one of a plurality of defined voluminous areas inside the transport where gestures are detected; and
when the gesture location is within one of the plurality of voluminous areas, identify the action associated with the gesture.

12. The transport of claim 9, wherein the computing device is further configured to
determine whether the gesture location was within one of a plurality of defined voluminous areas inside the transport where gestures are detected; and
when the gesture location is not within one of the plurality of voluminous areas, cancel the gesture.

13. The transport of claim 9, wherein the computing device identifies the gesture location by being further configured to determine whether the gesture is performed in at least one priority location within the transport; and
when the gesture is performed in the at least one priority location within the transport, the computing device is configured to perform the action.

14. The transport of claim 9, wherein the computing device identifies the gesture location by the computing device being configured to determine whether the gesture is performed in at least one priority location within the transport; and
when the gesture is not performed in the at least one priority location within the transport, the computing device determines whether the action is a transport operation action or a non-transport operation action, and when the action is not a transport operation action, the computing device performs the action.

15. A non-transitory computer readable storage medium configured to store instructions that when read by a process, cause the processor to perform:
detecting a gesture in a transport performed by a transport occupant;
determining a numerical gesture score associated with the gesture;

determining an occupant status associated with the transport occupant;

determining whether the occupant status permits the gesture to be performed;

determining whether a sum of the numerical gesture score and a numerical current transport operation score exceeds a numerical maximum transport safe operation score threshold, wherein the numerical current of transport score is based on one or more components of the transport which are currently being operated and represent one or more numerical scores contributing to the numerical current transport score, and wherein a summed score that exceeds the numerical maximum transport safe ration score threshold is deemed to unacceptable to safe transport operation; and performing an action, by the transport, associated with the gesture, when the occupant status permits the gesture to be performed and the sum of the numerical gesture score and the numerical current transport operation score does not cause the transport to exceed the numerical maximum transport safe operation score threshold indicating the transport can be safely operated.

16. The non-transitory computer readable storage medium of claim 15, wherein the processor is further configured to perform:

identifying a gesture location of the gesture within the transport.

17. The non-transitory computer readable storage medium of claim 16, wherein the processor is further configured to perform:

determining whether the gesture location was within one of a plurality of defined voluminous areas inside the transport where gestures are detected; and when the gesture location is within one of the plurality of voluminous areas, identifying the action associated with the gesture.

18. The non-transitory computer readable storage medium of claim 16, wherein the processor is further configured to perform:

determining whether the gesture location was within one of a plurality of defined voluminous areas inside the transport where gestures are detected; and when the gesture location is not within one of the plurality of voluminous areas, cancelling the gesture.

19. The non-transitory computer readable storage medium of claim 16, wherein identifying the gesture location comprises determining whether the gesture is performed in at least one priority location within the transport; and when the gesture is performed in the at least one priority location within the transport, performing the action.

20. The non-transitory computer readable storage medium of claim 16, wherein identifying the gesture location comprises determining whether the gesture is performed in at least one priority location within the transport; and when the gesture is not performed in the at least one priority location within the transport, determining whether the action is a transport operation action or a non-transport operation action, and when the action is not a transport operation action, performing the action.

* * * * *